United States Patent
Chen et al.

(10) Patent No.: US 11,194,375 B2
(45) Date of Patent: Dec. 7, 2021

(54) MECHANISM OF POWER DELIVERY ON AN ASYMMETRICAL DUAL SIMPLEX LINK

(71) Applicant: Intel Corporation, Santa Clara, CA (US)

(72) Inventors: Huimin Chen, Portland, OR (US); Abdul Ismail, Beaverton, OR (US); Karthi Vadivelu, Folsom, CA (US); Yong Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 850 days.

(21) Appl. No.: 15/836,281

(22) Filed: Dec. 8, 2017

(65) Prior Publication Data

US 2019/0041954 A1 Feb. 7, 2019

(51) Int. Cl.
| | |
|---|---|
| *G06F 1/3215* | (2019.01) |
| *G06F 13/38* | (2006.01) |
| *H04L 12/40* | (2006.01) |
| *G06F 3/06* | (2006.01) |
| *G06F 13/40* | (2006.01) |
| *G06F 13/42* | (2006.01) |
| *G06F 1/3206* | (2019.01) |
| *G06F 1/3234* | (2019.01) |
| *G06F 1/26* | (2006.01) |

(52) U.S. Cl.
CPC ............ *G06F 1/3215* (2013.01); *G06F 1/266* (2013.01); *G06F 1/3206* (2013.01); *G06F 1/3278* (2013.01); *G06F 3/0655* (2013.01); *G06F 13/385* (2013.01); *G06F 13/4063* (2013.01); *G06F 13/4286* (2013.01); *H04L 12/40032* (2013.01)

(58) Field of Classification Search
CPC ...... G06F 1/3215; G06F 1/266; G06F 1/3206; G06F 1/3278; G06F 3/0655; G06F 13/385; G06F 13/4063; G06F 13/4286; H04L 12/40032
See application file for complete search history.

(56) References Cited

U.S. PATENT DOCUMENTS

| | | | |
|---|---|---|---|
| 9,215,113 B1* | 12/2015 | Chen | H04L 25/03343 |
| 10,044,410 B1* | 8/2018 | Lynch | B64D 41/00 |
| 2002/0105227 A1* | 8/2002 | Nerone | H02P 9/307 307/10.1 |
| 2012/0275196 A1* | 11/2012 | Chapman | H02M 7/53871 363/17 |
| 2016/0291663 A1* | 10/2016 | Sun | G06F 13/4022 |
| 2016/0292126 A1* | 10/2016 | Kunz | H04L 25/0276 |
| 2017/0019177 A1* | 1/2017 | Groepl | H04B 10/25891 |
| 2017/0085637 A1* | 3/2017 | Cencini | G06F 1/189 |
| 2018/0048309 A1* | 2/2018 | Vogt, IV | H03K 17/00 |
| 2019/0025897 A1* | 1/2019 | Atkinson | G06F 11/3027 |

* cited by examiner

*Primary Examiner* — Glenn A. Auve
(74) *Attorney, Agent, or Firm* — Schwegman Lundberg & Woessner, P.A.

(57) ABSTRACT

An apparatus to transfer data via a communication link comprises a power bus interface to a power bus of the communication link; at least one data lane transmitter and receiver pair configured to transfer data via a data lane of the communication link; and a power bus data transmitter and receiver pair configured to transfer data via the power bus using pulse width modulation of a data signal on the power bus.

19 Claims, 5 Drawing Sheets

MECHANISM OF POWER DELIVERY ON AN ASYMMETRICAL DUAL SIMPLEX LINK

TECHNICAL FIELD

Embodiments pertain to wired communications between electronic devices. Some embodiments relate to transferring data between electronic devices using a power bus. Some embodiments relate to transferring data between electronic devices using a Universal Serial Bus (USB) interface.

BACKGROUND

The Universal Serial Bus (USB) is an interface standard originally intended for attaching external peripheral devices to a host device (e.g., a personal computer) for plug-and-play capability. The USB protocol has been extended to industrial applications and as a way to charge mobile devices. Originally, a USB connection included four connections; two for a differential data lane and two for power/ground. The USB 3.1 standard includes additional connections for Enhanced SuperSpeed capability that supports gigabit-per-second (Gbps) rates. There is continued demand to expand the capability of the USB interface. Thus, there are general needs for devices, systems and methods that enhance the USB interface at minimum impact on power and cost.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
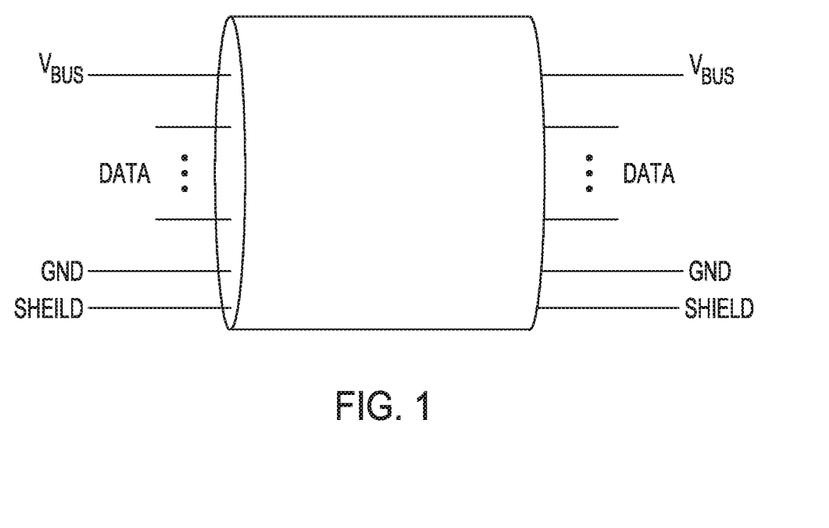
FIG. 1 is a diagram of a universal serial bus (USB) cable and USB interface signals in accordance with some embodiments.

The Universal Serial Bus (USB) interface is widely used and there is continued demand for expanded capability of USB. FIG. 1 is a diagram of a USB cable. The USB interface (e.g., USB 2.0) includes a power bus (VBus), a ground bus (GND) and at least one data lane (D+/D−). Power to the power bus is provided by a host device and can be used to power a connected external or peripheral device. A date lane includes two wires or lines to send and receive differential data signals. The data link is simplex and data is either transmitted or received on the data lane. Data can be transferred at megabit per second (Mbps) rates.

Figure 2:
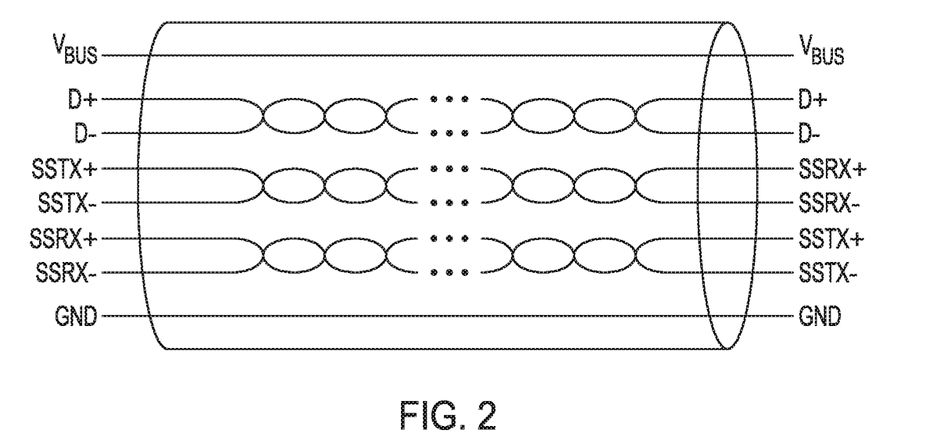
FIG. 2 is a diagram of a USB cable for the extended USB 3.1 standard in accordance with some embodiments.

FIG. 2 is a diagram of a USB cable for the extended USB 3.1 standard. It is extended to include two differential Enhanced SuperSpeed data lanes (SSTX+/SSTX−, SSRX+/SSRX−) for duplex communication. The data lanes are shown as twisted pairs and data is transferred at Gbps rates on the SuperSpeed data lanes.

A possibility to further extend the capability of USB is to use the power bus connection to transfer additional digital data between devices. The digital data would be superimposed onto the DC voltage provided by the power bus connection.

One approach to add digital data to the power bus is to use frequency shift keying (FSK). In FSK, different frequencies are used to indicate different data bits (e.g., a first frequency indicates a "0" bit value and a different second frequency indicates a "1" bit value). However, adding FSK to USB would involve designing complex transceivers and would involve a penalty in power used and involve low data throughput.

Currently, the USB 3.1 standard allows for low frequency periodic signaling (LFPS) on differential data lines that are terminated but in an electrical idle state. The electrical idle state is a low power state in which the transmitter terminations (TX+/TX−) are set to the same constant value. A better approach than FSK to add data signaling to the power bus of USB is to add LFPS capability to the power bus. The LFPS signaling can be leveraged for use on the power bus without adding complex transceiver circuitry.

Figure 3:
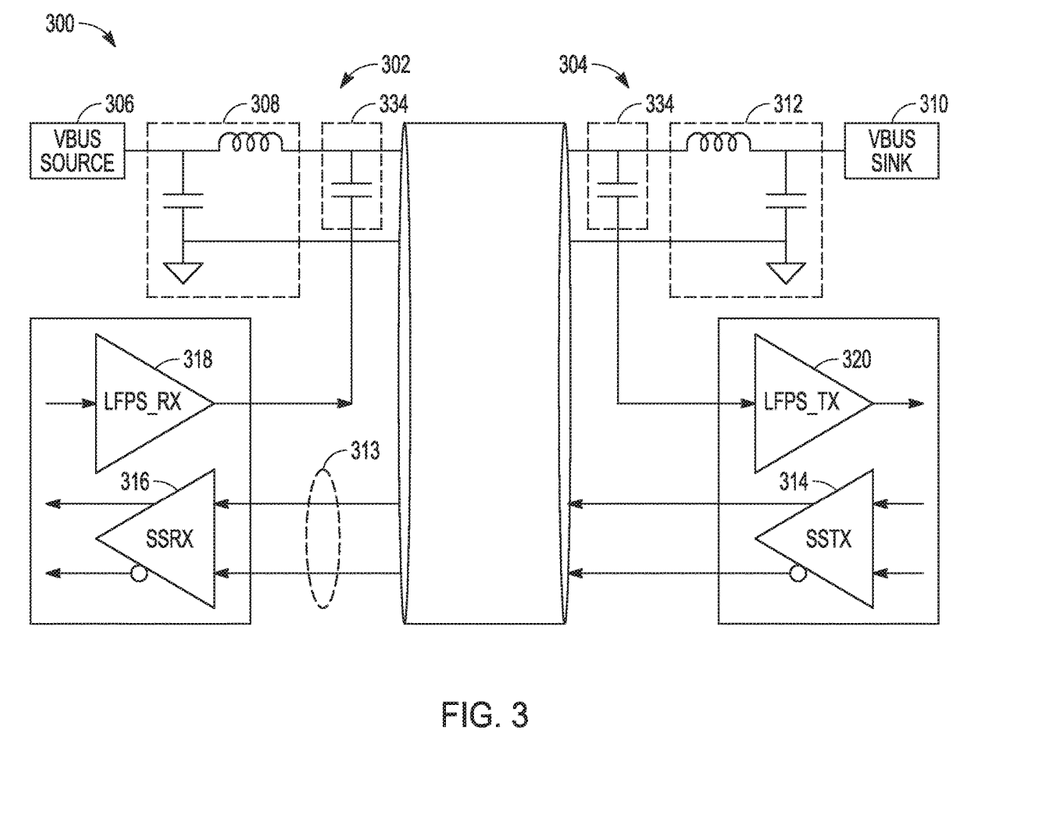
FIG. 3 is a block diagram of an example of a communication link in accordance with some embodiments.

FIG. 3 is a block diagram of an example of a USB communication link 300 having a host device side 302 and peripheral device side 304. Both the host device and the peripheral device include a power bus interface to the power bus (VBus). The host device power bus interface may include a power source 306 and an isolation circuit 308. The peripheral device power bus interface may include a power sink 310 and an isolation circuit 312. The power sink 310 can include a power circuit operatively coupled to the power bus interface, and the power circuit receives power from the power bus of the communication link to power at least a portion of the peripheral device. In variations, the host device includes the power sink and the peripheral device includes the power source.

The communication link also includes at least one data lane 313. In the example of FIG. 3, the data lane shown is one half of a SuperSpeed duplex data lane. The other half of the duplex data lane is not shown. In variations, the communication link is a simplex link with data being transferred only from the host side to the peripheral side, or only from the peripheral side to the host side. In certain embodiments, the data lane is a USB 2.0 differential data lane (D+/D−) as shown in FIG. 1. In certain embodiments, the data lane is a USB 2.0 high speed data lane. Each of the host and peripheral devices may include a data lane transmitter and receiver pair for the data lane. In the example of FIG. 3, only the data lane transmitter 314 is shown for the peripheral device side 304 and only the data lane receiver 316 is shown for the host device side 302. The data lane transmitter of the host device and the data lane receiver of the peripheral device are not shown. Data is transferred between the devices over the duplex data lane using the data lane transmitter/receiver pairs. For a simplex link, the peripheral device and the host device may include only the data lane transmitter or the data lane receiver. As explained previously herein, if the data lane is a SuperSpeed duplex data lane, data can be transferred in the Gbps range.

In addition to the data lane transmitter/receiver pairs, each of the host and peripheral devices also includes a power bus data transmitter and receiver pair. In the example of FIG. 3, only the power bus data transmitter 318 is shown for the host device and only the power bus data receiver 320 is shown for the peripheral device. The power bus data transmitter and receiver pairs transfer data via the power bus using LFPS. LFPS is a form of pulse width modulation (PWM) of a data signal.

Figure 4:
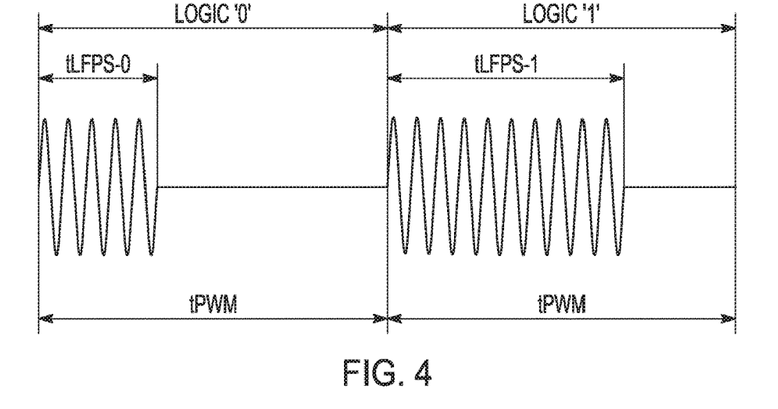
FIG. 4 is an illustration of an example of low frequency periodic signaling (LFPS) in accordance with some embodiments.

FIG. 4 is an illustration of an example of LFPS. A representation of a logical "0" and a representation of a logical "1" are shown in FIG. 4. A data signal having a single frequency is transmitted, and the value of "0" or "1" is determined by the width of the duty cycle of the signal. In the example of FIG. 4, a longer duty cycle (tLFPS) during the PWM time period (tPWM) represents a logical "1". The power bus data transmitter and receiver pairs transfer data via the power bus by PWM of the data signal on the power bus. If no signal is present during the PWM time period, the power bus data signaling may be in an idle state.

Figure 5:
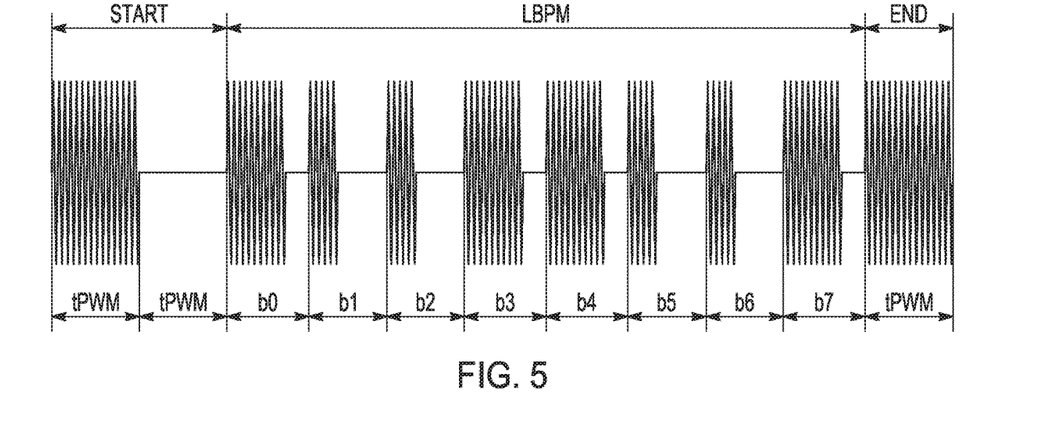
FIG. 5 is an illustration of an example of an LFPS based pulse width modulated message (LBPM) in accordance with some embodiments.

LFPS bits can be formed into a LFPS based PWM message (LBPM). FIG. 5 is an illustration of an example of an LBPM. The LBPM includes a start bit, and end bit, and eights bits of information between the start and end bits. In the Example of FIG. 5, the start bit is indicated by transmitting the data signal for an entire first PWM time period (tPWM), followed by a second PWM time period in which the data signal is not present. The end bit is indicated by transmitting the data signal for the entire the last PWM time period. The eight data bits are transmit between the start bit and end bit, and in the example the data bits are 10011001.

Figure 6:
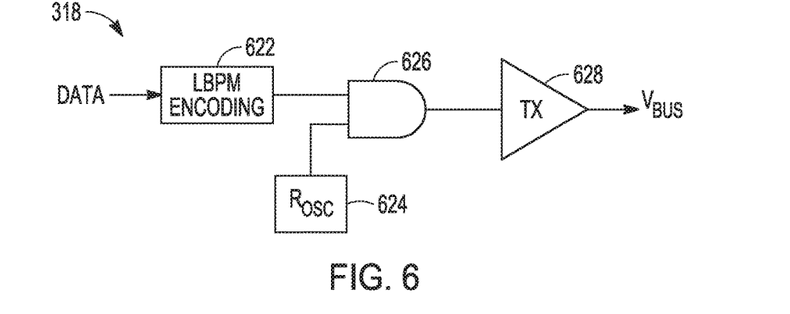
FIG. 6 is a block diagram of an example of a power bus data transmitter in accordance with some embodiments.

FIG. 6 is a block diagram of an example of a power bus data transmitter 318. The power bus data transmitter 318 includes an LBPM encoding circuit 622, a ring oscillator circuit (Rosc) 624, logic circuitry 626, and an LFPS driver 628. The LBPM encoding circuit 622 encodes LBPM data for transmission via the power bus. The ring oscillator 624 provides the frequency for the data signal, and the logic circuitry 626 combines the encoded LBPM and the data signal frequency into the PWM data for transmission on the power bus.

Figure 7:
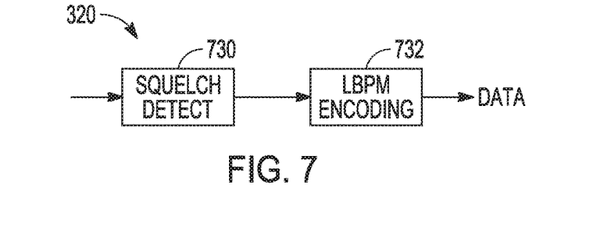
FIG. 7 is a block diagram of an example of a power bus data receiver in accordance with some embodiments.

FIG. 7 is a block diagram of an example of a power bus data receiver 320. The power bus data receiver includes a squelch detect circuit 730 and a LBPM decoding circuit 732. The LBPM decoding circuit 732 initiates decoding of LBPM data received on the power bus in response to the squelch detect circuit detecting the data signal on the power bus. In some embodiments, the squelch detect circuit includes a bandpass filter circuit to detect signal energy on the power bus having the frequency of the ring oscillator circuit 624 of FIG. 6.

Returning to FIG. 3, the power bus transmitter/receiver pairs of the host device and peripheral device are coupled to the power bus using an alternating current (AC) coupling. In FIG. 3, the AC coupling 334 includes a capacitor coupled between the power bus transmitter/receiver pairs and the power bus.

Figure 8:
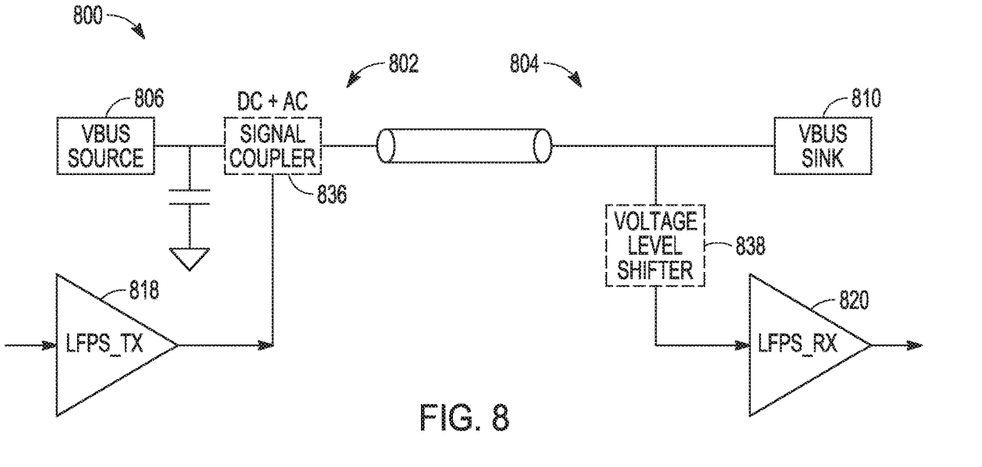
FIG. 8 is a block diagram of another example of a communication link in accordance with some embodiments.

FIG. 8 is a block diagram of another example of a communication link 800 having a host device side 802 and peripheral device side 804. The host device power bus interface includes a power source 806 and the peripheral device power bus interface includes a power sink 810. Each of the host and peripheral devices includes a power bus data transmitter and receiver pair. In the example of FIG. 8, only the power bus data transmitter 818 is shown for the host device and only the power bus data receiver 820 is shown for the peripheral device. The communication link also includes one or more data lanes (not shown) and can include one or both of a simplex data lane and a duplex data lane.

The power bus data transmitter 818 is coupled to the power bus using a signal coupler circuit 836. The output of the signal coupler results is an AC signal component and a direct current (DC) signal component. The result may be the AC signals in FIGS. 3 and 4 being shifted by a DC voltage level. An example of the signal coupling in FIG. 8 can include the capacitive coupling in FIG. 3 without the DC circuit isolation. The power bus data receiver 820 is coupled to the power bus using a voltage level shifter circuit 838. The voltage level shifter provides a signal to the power bus data receiver 820 that is an AC signal with the voltage level shift reduced or removed.

Figure 9:
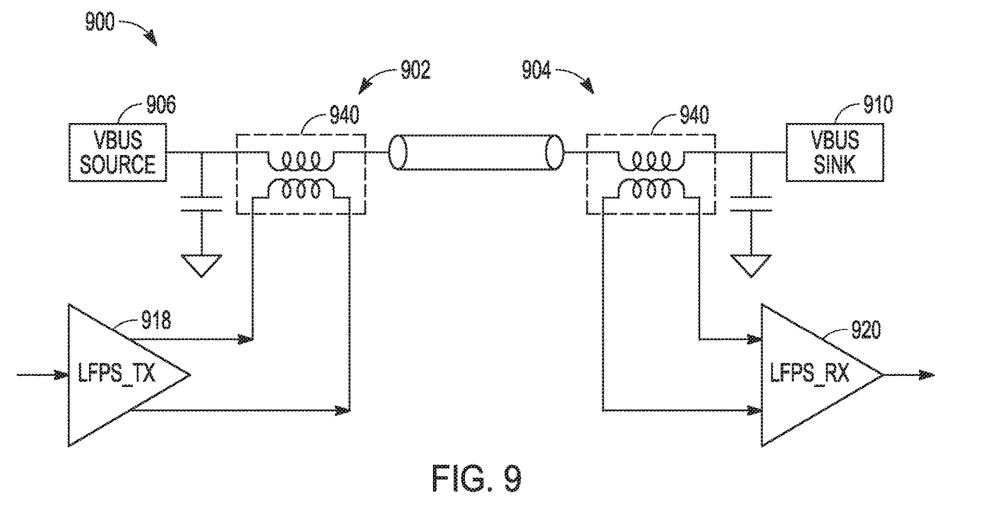
FIG. 9 is a block diagram of a further example of a communication link in accordance with some embodiments.

FIG. 9 is a block diagram of another example of a communication link 900 having a host device side 902 and peripheral device side 904. The host device power bus interface includes a power source 906 and the peripheral device power bus interface includes a power sink 910, and each of the host and peripheral devices includes a power bus data transmitter and receiver pair. The power bus data transmitter 918 and power bus data receiver 920 are coupled to the power bus using an inductive isolation coupling 940 to add and extract and AC signal from the power bus.

Figure 10:
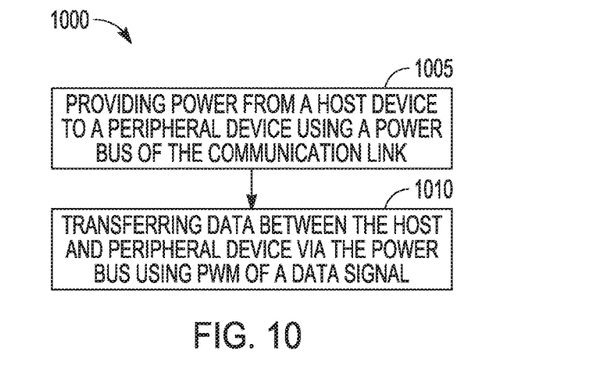
FIG. 10 is a flow diagram of a method of operating a communication link between electronic devices in accordance with some embodiments.

FIG. 10 is a flow diagram of a method 1000 of operating a communication link between electronic devices. At 1005, power is provided from a host device to a peripheral device using a power bus of the communication link. In some embodiments, the communication link is a USB, and power is provided from the host device to the peripheral using a voltage bus (VBus) connection of the USB. The communication link includes the power bus and at least one data lane in addition to the power bus. In some embodiments, the communication link includes a simplex data lane. In some embodiments, the communication link includes a SuperSpeed duplex data lane.

At 1010, data is transferred between the host and peripheral device via the power bus using PWM of a data signal having a single signal frequency. In some embodiments, the PWM includes LFPS. In further embodiments, the data is transferred using LFPS based PWM signaling (LBPS) to form encoded LBPMs and the LBPMs are decoded when received to recover the transmitted data. The communication of data and messages can follow link initialization that is similar to the USB initialization.

Figure 11:
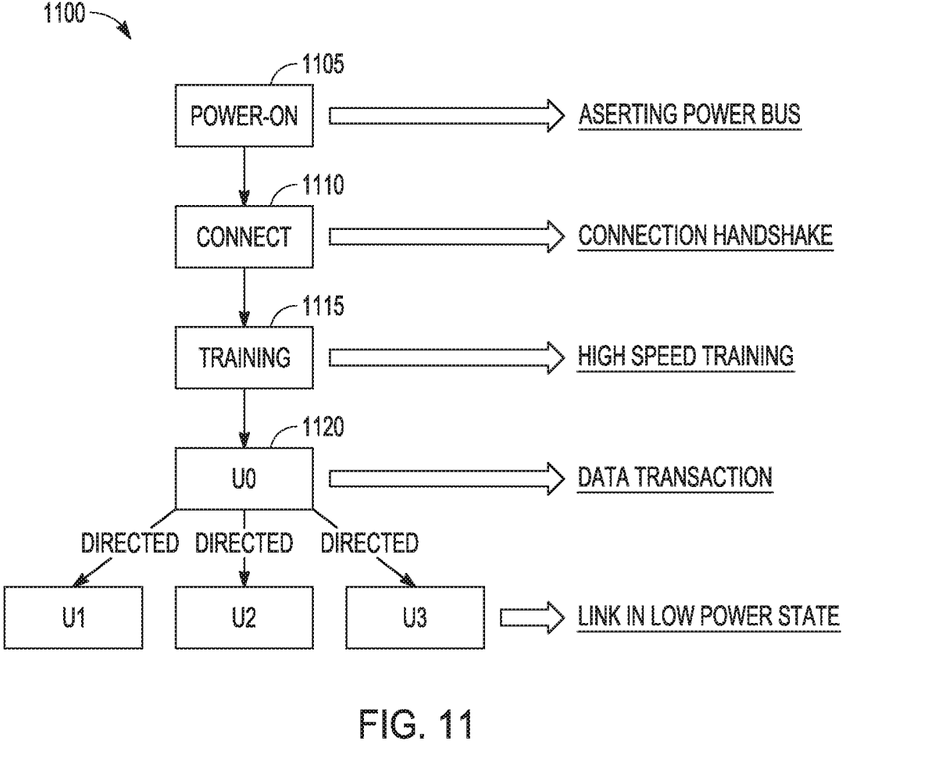
FIG. 11 is a flow diagram of an example of a communication link operation state machine in accordance with some embodiments.

FIG. 11 is a flow diagram of an example of a communication link operation state machine 1100. The process flows through the illustrated states to initialize and operate the link. At state 1105, the power on the power bus of the communication link is asserted by the host device. Upon power-on, the host device's power bus data receiver is on and is waiting for the peripheral side of the communication link to initiate start of the operation. In some embodiments, the power on the power bus is asserted by the peripheral device, and upon power-on the peripheral device's power bus data receiver is on and waiting for the host side to initiate start of the operation.

When the peripheral side of the communication link receives power from the power bus, the power bus data transmitter and receiver at the peripheral device begin operation to perform a connection handshake according to a protocol at state 1110. The power bus data transmitter may send Polling.LFPS as defined by the USB 3.1 specification, but the polling information is transferred to the host device via the power bus to the power bus data receiver of the host device instead of using a data lane. The host device, upon receiving the polling information and as part of the connection handshake, responds with the same Polling.LFPS through the power bus. Once the host port and the peripheral port achieve an exit handshake, the host device begins to enumerate the device functions of the peripheral device, and configures the peripheral device to the mode of operation it supports.

The communication link is a USB SuperSpeed duplex data link and includes data lane transmitters/receivers (SSTX/SSRX). At state 1115, once the configuration of the peripheral device is completed, the communication link begins a high-speed closed-loop training. The training can be an iterative process to reach link optimization between the pre-equalizer of the SSTX and the voltage swing, and the equalizer of the SSRX and the clock data recovery at the peripheral device.

At state 1120, the peripheral device can start data transactions with the host device using the duplex data lane once the training is complete. The communication link may enter a low power state initiated by the device when no data packets are to be transmitted and data communication becomes idle.

The several embodiments described herein provide for data communications on the power bus of a communication link based on USB LFPS. The circuitry that is used for transmitting and receiving data via the power bus is low power and not overly complex. The power bus and power bus transmitters/receivers form a dual-direction simplex link using a power bus between two devices for asymmetrical data traffic and power delivery.

Additional Description and Examples

Example 1 includes subject matter (such as an apparatus to transfer data via a communication link) comprising: a power bus interface to a power bus of the communication link; at least one data lane transmitter and receiver pair configured to transfer data via a data lane of the communication link; and a power bus data transmitter and receiver pair configured to transfer data via the power bus using pulse width modulation (PWM) of a data signal on the power bus.

In Example 2, the subject matter of Example 1 optionally includes a communication link that is a universal serial bus (USB) and the at least one data lane includes at least one USB SuperSpeed transmitter and receiver pair.

In Example 3, the subject matter of one or both of Examples 1 and 2 optionally includes a low frequency periodic signaling based PWM message (LBPM) encoding circuit configured to encode LBPM data for transmission via the power bus.

In Example 4, the subject matter of one or any combination of Examples 1-3 optionally includes a squelch detect circuit and a LBPM decoding circuit, wherein the LBPM decoding circuit initiates decoding of LBPM data on the power bus in response to the squelch detect circuit detecting the data signal on the power bus.

In Example 5, the subject matter of one or any combination of Example 1-4 optionally includes a power bus data transmitter and receiver pair are coupled to the power bus using an alternating current (AC) coupling.

In Example 6, the subject matter of one or any combination of Examples 1-5 optionally includes power bus data transmitter and receiver pair are coupled to the power bus using an inductive isolation coupling.

In Example 7, the subject matter of one or any combination of Examples 1-6 optionally includes a level shifter circuit operatively coupled between the power bus and the power bus data receiver.

In Example 8, the subject matter of one or any combination of Examples 1-7 optionally includes a power bus interface is operatively coupled to a power source.

In Example 9, the subject matter of one or any combination of Examples 1-7 optionally includes a power circuit operatively coupled to the power bus interface, wherein the power circuit is configured to receive power from the power bus of the communication link.

In Example 10, the subject matter of one or any combination of Examples 1-9 optionally includes a communication link that is a USB 2.0 interface link, and the at least one data lane includes at least one USB 2.0 High Speed transmitter and receiver pair.

Example 11 includes subject matter (method of operating a communication link, a means for performing acts, or a machine-readable medium including instructions that, when performed by the machine, cause the machine to perform acts), or can optionally be combined with the subject matter of one or any combination of Examples 1-10 to include such subject matter, comprising: providing power from a first device to a second device using a power bus of the communication link, wherein the communication link includes the power bus and at least one data lane; and transferring data between the first device and second device via the power bus using pulse width modulation (PWM) of a data signal having a single signal frequency.

In Example 12, the subject matter of Example 11 optionally includes providing power from the first device to the second using a voltage bus (VBus) connection of a universal serial bus (USB); and wherein the transferring data includes transferring data using low frequency periodic signaling based PWM signaling (LBPS) via the VBus connection of the USB.

In Example 13, the subject matter of Example 12 optionally includes transferring an encoded low frequency periodic signaling based PWM message (LBPM) via the power bus.

In Example 14, the subject matter of one or both of Examples 12 and 13 optionally include initiating decoding of a LBPM when detecting energy on the power bus that includes a frequency of a data signal used for the LBPS.

In Example 15, the subject matter of one or any combination of Examples 11-14 optionally includes transferring data related to a connection protocol performed by the host device and the peripheral device via the power bus.

In Example 16, the subject matter of one or any combination of Examples 11-15 optionally includes transferring polling information via the power bus.

Example 17 includes subject matter (such as an electronic device system), or can optionally be combined with one or any combination of Examples 1-16 to include such subject matter, comprising: a communication link including a power bus and at least one data lane; a host device including a host data lane transmitter and receiver pair operatively coupled to the data lane, a host power bus interface, and a host power bus data transmitter and receiver pair operatively coupled to the power bus; and a peripheral device including a peripheral data lane transmitter and receiver pair operatively coupled to the data lane, a peripheral power bus interface, and a peripheral power bus data transmitter and receiver pair operatively coupled to the power bus, wherein the host device is configured to source power to the peripheral device via the power bus, and the host device and peripheral device are configured to transfer data via the power bus using pulse width modulation (PWM) of a data signal on the power bus using the host and peripheral transmitter and receiver pairs.

In Example 18, the subject matter of Example 17 optionally includes a communication link is a universal serial bus (USB), the power bus is a USB VBus, and the host and peripheral data lane transmitter and receiver pairs are USB SuperSpeed transmitter and receiver pairs.

In Example 19, the subject matter of one or both of Examples 17 and 18 optionally includes power bus data transmitter and receiver pairs that include low frequency periodic signaling based PWM message (LBPM) encoding and decoding circuits, and the host device and peripheral device are configured to transfer LBPM data via the power bus.

In Example 20, the subject matter of one or any combination of Examples 17-19 optionally includes a host device and peripheral device that include processing circuitry configured to initiate transferring data via the power bus according to a USB low frequency periodic signaling (LFPS) polling protocol.

In Example 21, the subject matter of one or any combination of Examples 17-20 optionally include a host device and peripheral device that include processing circuitry configured to initiate transferring data via the power bus according to a connection protocol to configure an operating mode of the peripheral device.

In Example 22, the subject matter of one or any combination of Examples 17-21 optionally include a communication link that is a USB 2.0 interface link, and the host and peripheral data lane transmitter and receiver pairs are USB 2.0 High Speed transmitter and receiver pairs.

These non-limiting examples can be combined in any permutation or combination. The above detailed description includes references to the accompanying drawings, which form a part of the detailed description. The drawings show, by way of illustration, specific embodiments that can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. An apparatus to transfer data via a communication link, the apparatus comprising:
    a power bus interface to a power bus of the communication link, wherein the communication link is a universal serial bus (USB);
    at least one data lane that includes at least one US B SuperSpeed transmitter and receiver pair configured to transfer data via the communication link; and
    a power bus data transmitter and receiver pair configured to transfer data via the power bus using pulse width modulation (PWM) of a data signal on the power bus.

2. The apparatus of claim 1, including a periodic signaling based PWM message encoding circuit configured to encode PWM message data for transmission via the power bus.

3. The apparatus of claim 1, including a squelch detect circuit and a PWM message decoding circuit, wherein the PWM message decoding circuit initiates decoding of PWM message data on the power bus in response to the squelch detect circuit detecting a data signal on the power bus.

4. The apparatus of claim 1, wherein the power bus data transmitter and receiver pair are coupled to the power bus using an alternating current (AC) coupling.

5. The apparatus of claim 1, wherein the power bus data transmitter and receiver pair are coupled to the power bus using an inductive isolation coupling.

6. The apparatus of claim 1, including a level shifter circuit operatively coupled between the power bus and the power bus data receiver.

7. The apparatus of claim 1, wherein the power bus interface is operatively coupled to a power source.

8. The apparatus of claim 1, including a power circuit operatively coupled to the power bus interface, wherein the power circuit is configured to receive power from the power bus of the communication link.

9. The apparatus of claim 1, wherein the communication link is a USB 3.1 interface link.

10. A method of operating a communication link, the method comprising:
    providing power from a first device to a second device using a power bus of the communication link, wherein the communication link includes the power bus and at least one data lane; and transferring polling information via the power bus between the first device and second device via the power bus using pulse width modulation (PWM) of a data signal having a single signal frequency.

11. The method of claim 10, wherein the providing power includes providing power from the first device to the second using a voltage bus (VBus) connection of a universal serial bus (USB); and wherein the transferring data includes transferring data using periodic signaling based PWM signaling via the VBus connection of the USB.

12. The method of claim 11, wherein the transferring data includes transferring an encoded periodic signaling based PWM message via the power bus.

13. The method of claim 11, including initiating decoding of an encoded periodic signaling based PWM message when detecting energy on the power bus that includes a frequency of a data signal used for the periodic signaling based PWM signaling.

14. The method of claim 11, wherein the transferring data includes transferring data related to a connection protocol performed by a host device and the peripheral device via the power bus.

15. An electronic device system comprising:
a communication link including a power bus and at least one data lane;
a host device including a host data lane transmitter and receiver pair operatively coupled to the data lane, a host, power bus interface, and a host power bus data transmitter and receiver pair operatively coupled to the power bus; and
a peripheral device including a peripheral data lane transmitter and receiver pair operatively coupled to the data lane, a peripheral power bus interface, and a peripheral power bus data transmitter and receiver pair operatively coupled to the power bus,
wherein the host device is configured to source power to the peripheral device via the power bus, and the host device and peripheral device are configured to transfer data via the power bus using pulse width modulation (PWM) of a data signal on the power bus using the host and peripheral transmitter and receiver pairs and the host device and peripheral device include processing circuitry configured to initiate transferring data via the power bus according to a connection protocol to configure an operating mode of the peripheral device.

16. The electronic device system of claim 15, wherein the communication link is a universal serial bus (USB), the power bus is a USB VBus, and the host and peripheral data lane transmitter and receiver pairs are USB SuperSpeed transmitter and receiver pairs.

17. The electronic device system of claim 15, wherein the host and peripheral power bus data transmitter and receiver pairs include periodic signaling based PWM message encoding and decoding circuits, and the host device and peripheral device are configured to transfer periodic signaling based PWM message data via the power bus.

18. The electronic device system of claim 15, wherein the host device and peripheral device include processing circuitry configured to initiate transferring data via the power bus according to a USB periodic signaling polling protocol.

19. The electronic device system of claim 15, wherein the communication link is a USB 2.0 interface link, and the host and peripheral data lane transmitter and receiver pairs are USB 2.0 High Speed transmitter and receiver pairs.

* * * * *